July 12, 1966     F. L. VER SNYDER     3,260,505
GAS TURBINE ELEMENT

Filed April 17, 1964     9 Sheets-Sheet 1

INVENTOR
FRANCIS L. VER SNYDER
BY
MORGAN, FINNEGAN, DURHAM & PINE

ATTORNEYS

July 12, 1966  F. L. VER SNYDER  3,260,505
GAS TURBINE ELEMENT
Filed April 17, 1964  9 Sheets-Sheet 2

INVENTOR.
FRANCIS L. VER SNYDER
BY
MORGAN, FINNEGAN, DURHAM & PINE
ATTORNEYS

STRESS RUPTURE DATA
AT 1400°F

STRESS RUPTURE DATA
AT 1800°F & 1900°F

'CREEP CURVES'

'CREEP CURVES'

July 12, 1966  F. L. VER SNYDER  3,260,505
GAS TURBINE ELEMENT

Filed April 17, 1964  9 Sheets-Sheet 7

INVENTOR.
FRANCIS L. VER SNYDER
BY
MORGAN, FINNEGAN, DURHAM & PINE
ATTORNEYS

July 12, 1966   F. L. VER SNYDER   3,260,505
GAS TURBINE ELEMENT
Filed April 17, 1964   9 Sheets-Sheet 8

INVENTOR
FRANCIS L. Ver SNYDER
BY
MORGAN, FINNEGAN, DURHAM & PINE
ATTORNEYS

July 12, 1966  F. L. VER SNYDER  3,260,505
GAS TURBINE ELEMENT
Filed April 17, 1964  9 Sheets-Sheet 9

INVENTOR.
FRANCIS L. Ver SNYDER
BY
MORGAN, FINNEGAN, DURHAM & PINE
ATTORNEYS

United States Patent Office 3,260,505
Patented July 12, 1966

3,260,505
GAS TURBINE ELEMENT
Francis L. Ver Snyder, Hamden, Conn., assignor to United Aircraft Corporation, East Hartford, Conn., a corporation of Delaware
Filed Apr. 17, 1964, Ser. No. 361,323
12 Claims. (Cl. 253—77)

This appliction is a continuation-in-part of a copending application, Serial No. 317,535, filed October 21, 1963, now abandoned.

The present invention relates to a novel and improved cast gas contacting blade for gas turbine power plants. The gas contacting blades for gas turbine power plants can either be of the moving type, the so-called turbine rotor blades, or of the stationary type, sometimes called turbine stator vanes. The object of this invention is to provide such blades, whether movable or stationary, which, for a given stress and temperature, exhibit longer life before rupture, and have a greater uniformity of stress rupture life than prior conventionally cast gas contacting blades of the same alloy. A further object is the provision of cast gas contacting blades for gas turbines which exhibit "third stage creep" so that predictable changes in creep rate may be utilized in the estimation or determination of time between engine overhauls. Still another object is the provision of a novel and improved cast gas contacting blade for gas turbine power plants which has exceptionally good tensile elongation properties, and can be operated at substantially higher temperatures than prior, conventionally cast blades made from the same alloy. The invention further provides gas turbine blades having good ductility and elongation, extended life, unusually uniform strength properties, and relatively high tensile strength, although formed of alloys which normally and conventionally have good high temperature strength, but are deficient in that they exhibit low ductility and elongation which is an indication of their relative brittleness.

Heretofore, gas turbine blades made from cast high temperature resistant alloys have been widely used but have been subject to limitation as to their useful life between engine overhauls and it is standard practice to limit the useful life of a gas turbine before rebuilding to a total number of hours which is much less than the expected life of the blades, based upon the statistically expected life of the blades for the reason that the useful life must be less than the minimum life of any blade, although most blades would far exceed that minimum life in actual use.

As contrasted with the relatively erratic behavior of conventionally cast blades, the gas turbine blades of the present invention, although made from alloys of the same constituents as the alloys of prior conventionally cast blades, having a face centered, cubic, crystal structure, uniformly exhibit a longer life under similar conditions of stress and temperature and do not fail without warning, but rather, after they have been used for this longer life period, the blades generally elongate during a period of many hours, thereby allowing longer operating life between engine overhauls and contributing to greater economy in actual operation.

The blades of the present invention have an elongated, columnar macro-grain structure with substantially unidirectional crystals aligned substantially parallel to the axis of the cast blade; that is, with a columnar structure in the alloy of the blade. The grain boundaries of the alloy of the cast blade are oriented so as to be substantially parallel to the principal stress axis of the blade, and there is an almost complete elimination of grain boundaries normal to this stress axis.

Alloys which are suitable for use in making the novel cast gas turbine blades of the present invention are preferably nickel base (containing at least 35% nickel and preferably and more usually more than 50% nickel) high temperature alloys, falling within the following weight percentage ranges for the various constituents of the alloy, although, as set forth below, certain cobalt base alloys are also suitable for use in accordance with the present invention.

The nickel base alloys referred to are those having the following weight percentage range of composition of ingredients:

|   | Percent |
|---|---|
| Chromium | 2 to 25 |
| Cobalt | 4 to 30 |
| Molybdenum or tungsten | 2 to 14 |
| Aluminum | 0 to 9 |
| Titanium | 0 to 6 |
| Aluminum and titanium, at least | 3.5 |
| Carbon | 0.1 to 0.5 |
| Boron | 0.005 to 0.1 |
| Zirconium | 0.05 to 0.2 |

Balance essentially nickel in a quantity of at least 35% and preferably and usually more than 50% by weight, although, in addition to the foregoing constituents, the alloy may include the following elements within the following percentage ranges:

|   | Percent, max. |
|---|---|
| Vanadium | 1.5 |
| Iron | 5.0 |
| Manganese | 1.0 |
| Silicon | 1.0 | with trivial amounts of sulfur, phosphorus, copper, etc., which do not deleteriously affect the novel advantageous characteristics of the cast blades in their novel crystalline form. Molybdenum and tungsten in general are not both used, but it is usual to use only one or the other.

Certain cobalt alloys are also useful in the present invention and these include the alloys comprised within the following analyses:

|   | Percent, by weight |
|---|---|
| Chromium | 15 to 27 |
| Nickel | 0 to 12 |
| Tungsten | 5 to 12 |
| Titanium, maximum | 1 |
| Carbon | 0.40 to 1.2 |
| Zirconium | 0.05 to 2.5 | with optional additions of the following elements:

|   | Percent |
|---|---|
| Tantalum | 0 to 10 |
| Columbium | 0 to 3 |
| Boron, maximum | 0.01 |
| Iron, maximum | 1.5 |
| Manganese, maximum | 0.2 |
| Silicon, maximum | 0.2 |

The balance of the alloy being essentially cobalt preferably and usually more than 50% by weight and being not less than 35% by weight of the total alloy and as indicated, a portion of the cobalt may be replaced by nickel. As with the nickel alloys, the cobalt alloys may include trivial amounts of impurities such as sulfur, phosphorus, copper, and the like in amounts which do not deleteriously affect the novel advantageous characteristics of the cast blades in their novel crystalline form.

Among the alloys which are suitable for making the cast gas turbine blades of the present invention are many of the alloys falling within the ranges specified above and disclosed in the prior United States patents to: Thielemann, 3,026,198 of 1962; Thielemann, 2,948,606 of 1960; Bieber, 3,061,426 of 1962; Johnson, 2,747,993 of 1956; and the alloys which are commercially known as IN 100, SM 200, SM 302, X–40, WI–52 and Inconel 713C, which are selected from the group consisting of the nickel-rich and cobalt-rich alloys, such as are conventionally used in making gas-turbine blades for use under high temperatures and are characterized by their good strength, corrosion-resistance, erosion-resistance, good stress-rupture properties, and their face centered, cubic, crystal structures.

More specifically, the following alloys are preferred:

Inconel 713C which has a nominal chemical composition as follows:

| | Percent by weight |
|---|---|
| Cr | 14.0 |
| Mo | 4.5 |
| Cb | [1] 2.0 |
| Ti | 1.0 |
| Al | 6.0 |
| B | 0.01 |
| Zr | 0.08 |
| Co | 0 to 10 |
| C, max. | 0.20 |
| Ni (essentially) | Balance |

[1] Which may contain the usual amount of tantalum as an impurity.

In this alloy, there may be 2% columbium or 2% tantalum or a mixture of columbium and tantalum, up to 2% total. 1.5% columbium and 0.5% tantalum is preferred.

SM 200 is especially preferred, having a nominal chemical composition of:

| | Percent |
|---|---|
| Cr | 9.0 |
| Co | 10.0 |
| W | 12.5 |
| Cb | 1.0 |
| Al | 5.0 |
| Ti | 2.0 |
| Fe | 1.5 |
| B | 0.015 |
| Zr | 0.05 |
| C | 0.15 |
| Ni (essentially) | Balance |

IN 100 is another preferred alloy and has a nominal composition of:

| | Percent by weight |
|---|---|
| Cr | 9.5 |
| Co | 15.0 |
| Mo | 3.0 |
| V | 0.95 |
| Ti | 5.0 |
| Al | 5.57 |
| Fe | 1.0 |
| B | 0.015 |
| Zr | 0.06 |
| C | 0.175 |
| Ni | Remainder |

SM 302 is a cobalt base alloy which is useful in the present invention and has a nominal chemical analysis as follows:

| | Percent by weight |
|---|---|
| Cr | 21.5 |
| W | 10.0 |
| Ta | 9.0 |
| Zr | 0.25 |
| Fe | 1.0 |
| Ni, max. | 1.5 |
| B | 0.01 |
| C | 0.86 |
| Co | Remainder |

Other cobalt alloys which are useful in carrying out the present invention are those generally known as "WI–52" and "X–40", the compositions of which are as follows:

Alloy WI 52 is a cobalt base alloy having relatively large amounts of chromium and tungsten in its composition which is specified as follows:

| | Percent |
|---|---|
| Carbon | 0.40–0.50 |
| Manganese, max. | 0.50 |
| Phosphorus, max. | 0.040 |
| Sulfur, max. | 0.040 |
| Silicon, max. | 0.50 |
| Chromium | 20.00–22.00 |
| Tungsten | 10.00–12.00 |
| Columbium plus tantalum | 1.50–2.50 |
| Iron | 1.00–2.50 |
| Nickel, max. | 1.00 |
| Cobalt | Remainder |

Alloy X–40 is a cobalt base alloy having the following specification analysis:

| | Percent |
|---|---|
| Carbon | 0.45–0.55 |
| Manganese, max. | 1.0 |
| Silicon, max. | 1.0 |
| Phosphorus, max. | 0.04 |
| Sulfur, max. | 0.04 |
| Chromium | 24.5–26.5 |
| Nickel | 9.5–11.5 |
| Tungsten | 7.0–8.0 |
| Iron, max. | 2.0 |
| Cobalt | Remainder |

According to the process of the present invention, the alloy to be cast into the form of a gas turbine, gas contacting blade is melted in a vacuum furnace with a vacuum of 50μ or better, and after having been held at a temperature of from 100 to 250° above its melting point for a short period of time, is cast in a mold. The mold is preferably formed of ceramic or silicious material, such as a "shell mold" formed of alternate layers of finely divided silicious material, such as silicates, zirconia, or other argillaceous or refractory material and finely divided sand or like material, there usually being several layers of each of the two materials. Such shell molds are usually formed on a wax pattern, and after drying, the mold is fired to remove the wax as is customary in the "lost wax" molding method.

In the vacuum molding (and furnace) apparatus, the mold is provided with the electrical heating means so that its upper portion can be heated to a temperature, preferably at least 100° F. above the melting point of the alloy, prior to the pouring of the metal into the mold. When in casting position, the mold is supported with its bottom open end on a support member which can be chilled and will remain substantially colder than the body of the mold during the casting operation, thereby chilling the cast metal in the mold at its lower end.

The chilling of the cast metal at one end causes the blade to crystallize in a columnar structure having unidirectionally oriented crystals aligned substantially parallel to the axis of the cast blade and with almost complete avoidance of grain boundaries normal to the stress axis of the cast blade.

When the casting has cooled to room temperature, or sufficiently so that it does not react with the atmosphere, the vacuum may be destroyed and the cast blade and its mold are removed from the apparatus, after which the mold is removed, usually destructively, from the casting, and the casting is then ready to be finish-machined to complete its manufacture.

The foregoing general description of the gas turbine blades of the present invention and the process of making them is explanatory of the present invention and the principles thereof, and the following detailed description sets forth the preferred forms of the invention, as well as a variety of illustrative working examples of the present invention.

The process of making gas turbine blades according to the present invention is carried out in a vacuum chamber. Consequently, the process is particularly suited to the casting of high temperature creep-resistant alloys which require melting and casting in a vacuum, preferably 50μ or better. The process involves unidirectional solidification so as to establish all grain boundaries oriented parallel to the anticipated principal stress axis. The turbine blades are preferably formed by casting a molten alloy into a refractory mold heated by electrical means to provide a temperature gradient. The temperature gradient so established should consist of a temperature below the melting point of the alloy at the base of the mold, to a temperature above the melting point of the alloy maintained in the direction of the axis of the mold. The internal surfaces of the walls of the mold should be sufficiently smooth so as to prevent nucleation of solid in the liquid at the mold walls. A practical rate of growth of the grain oriented structure is obtained by making the bottom of the mold of high thermally conductive material, e.g., a water cooled copper plate. This results in a more rapid rate of heat removal from the bottom of the solidifying casting. The process, as described, results in unidirectional solidification of the molten metal along the temperature gradient. In particular, the macro-grain structure of the casting is aligned parallel to the axis of the casting, that is, the grain structure is "columnar." The desired columnar structures can be produced since the following two conditions are met in the procedure outlined above.

(1) The heat flow must be unidirectional, causing the liquid solid interface at the growing grains to move in one direction.

(2) There must be no nucleation in the melt ahead of the advancing interface.

The results of producing such a columnar structure in a casting are: (a) a grain boundary structure oriented with respect to the cast shape; and (b) a preferred orientation of the crystal structure of the grains.

Careful establishment of these conditions by the procedures outlined above results in cast gas turbine, gas contacting blades of the desired shape and dimensions. A ceramic blade mold is prepared for directional solidification by first preparing the base of the mold so that the basal wall surfaces will fit smoothly on the water cooled copper plate, and second, double winding the mold with molybdenum heater wire. The heater wires are connected to a power source and used to control the temperature of the melt in the blade mold during solidification. A gas turbine rotor blade obtained by employing this process is shown in FIGURE 1. A gas turbine stator vane obtained by employing this process is shown in FIGURE 11. The difference between the grain structure of a conventionally cast rotor blade or a stator vane and a unidirectionally cast rotor blade or stator vane can be revealed by macro-etching.

My process described above features increased elevated temperature properties with excellent ductility in a strong high temperature alloy as compared to the conventionally cast properties of this same alloy. The notable feature is that all of the results obtained on the directionally solidified material are above, and in many cases, substantially above those of the conventionally solidified material. This improvement in ductility is illustrated in the comparison of tensile elongation. Again, it is notable that all the results obtained are substantially above the average results of conventionally cast material. It is notable that the maximum in tensile strength coincides with the minimum in tensile ductility, as is customary for alloys of this type. Conventionally cast material would exhibit no minimum in ductility since the average values are substantially below the minimum for the directionally solidified material.

In comparisons of the stress-rupture results of directionally solidified and conventionally cast material, at all three temperatures (1400° F., 1800° F., and 1900° F.), the directionally solidified test alloy yields superior properties. Of major significance is the stress-rupture fracture elongation, the average of the conventionally the cast results lie at 3% elongation and below over the whole temperature range, whereas the directionally solidified material yields fracture elongations substantially above 3% elongation at all temperatures tested. Third stage creep is present at all the temperatures tested, namely, 1400° F., 1800° F., and 1900° F. The advantageous effect of directionally solidifying the test alloy on the rupture properties in terms of life time and stress shows that in all cases, the directionally solidified material is superior.

In addition to the properties measured by testing with the stress axis parallel to the columnar grain axis, tests with the stress axis normal to the elongated, columnar grain axis show that the grain structure of the conventionally cast blade has many boundaries normal to its principal stress axis, which is vertical. The properties of directionally solidified material taken transverse to the columnar direction are superior to the average properties of the conventional cast material, as shown in the immediately following table, and it was observed that the directionally solidified material properties fall above the curve for the conventionally cast material. It is apparent then that there is a sound technical basis for the substantial improvement in the properties observed by directionally solidifying and testing with grain boundaries parallel to the stress axis.

The following table shows the times required to rupture specimens of conventionally cast alloy SM 200 compared with specimens of directionally solidified alloy SM 200 when subjected to stresses of 95,000, 90,000, and 85,000 pounds per square inch at 1400° F.

| Stress, k.s.i. | Time to Rupture in Hours at 1400° F. | |
| --- | --- | --- |
| | Conventionally Cast SM 200 | Directionally Solidified SM 200 |
| 95 | 0.1 | 15 |
| 90 | 60 | 155 |
| 85 | 200 | 245 |

Formation of gas turbine, gas contacting blades according to the present invention, as described compared to conventionally cast material, consistently yields the following advantages:

(1) Tensile properties: improved ductility at (at least) equivalent strength levels over a wide temperature range.

(2) Creep rupture properties: longer lifetimes at all temperatures, a 50–100° F. increase in potential operating temperature or a high rupture strength at the same test temperature, increased ductility at all temperatures with minimization of low ductility characteristics in the intermediate temperature range, $T/Tm=0.5$.

(3) Elimination of the intercrystalline failure mode.

(4) Development of definite third stage creep.

(5) Casting properties: a minimum of microporosity in castings made by this process since solidification can occur only at the liquid solid interface; substantially no macrosegregation in the casting since the solidification and cooling rate more nearly approximate equilibrium conditions; substantially no entrapment of foreign matter since the moving front will force such foreign matter ahead of it into feeder heads provided for the purpose.

(6) Thermal shock resistance: uniformly high thermal shock resistance is obtained compared to the widely varying and unpredictable thermal shock characteristics of prior art conventionally cast products.

The gas turbine, gas contacting blades according to the present invention are highly stable at elevated temperatures since the texture developed in the columnar growth as well as the more nearly equilibrium casting conditions tends to prevent recrystallization at elevated temperatures.

The following are specific and preferred embodiments of the invention of the present invention.

Shell molds for gas turbine, gas contacting blades, i.e., turbine rotor blades, were prepared in electric resistance heating elements on their exteriors, and connected to a power supply so as to heat the upper portions of the molds to temperatures of about 2500° F. to 2800° F. and at least 100° F. above the melting point of the alloy.

Once the mold has been assembled on the copper block in the furnace chamber, the furnace chamber is closed and the internal pressure reduced until the pressure is less than preferably about 50μ and heating of the mold begins. The heating of the mold in the furnace chamber proceeds gradually so as to safely raise the temperature of the assembly and assure outgassing the components, the melt stock of alloy "SM 200" having been already charged into the furnace. The temperature of the mold assembly is gradually raised to approximately 1200° F. A sufficient interval of time is allowed for continued outgassing of the mold and the achievement of uniform temperature distribution in the mold assembly. Subsequently, the temperature of the mold is raised in gradual steps until the desired temperature of about 2500° F. to 2800° F. is achieved in the mold assembly. The melt charge is then melted and outgassed and when both the temperatures of the melt and of the mold assembly have been achieved, the melt is poured at approximately 2700° F. Throughout the heat-up cycle, the water to the water cooled copper block is controlled so that the outflowing water temperature is approximately 180° F. Just prior to pouring of the melt, the water is turned on full until the temperature of the outflowing water drops to ambient and at that time the melt is poured. Subsequent to pouring, the power to the mold assembly heater is reduced in a step-wise manner after a holding period of approximately 20 minutes, after the furnace and casting are allowed to cool, air or nitrogen gas is introduced into the furnace, and the castings are removed from the furnace.

Thereafter, the gas contacting blade, whether rotor blade or stator vane was finish machined to the precise dimensions required.

Figure 7:
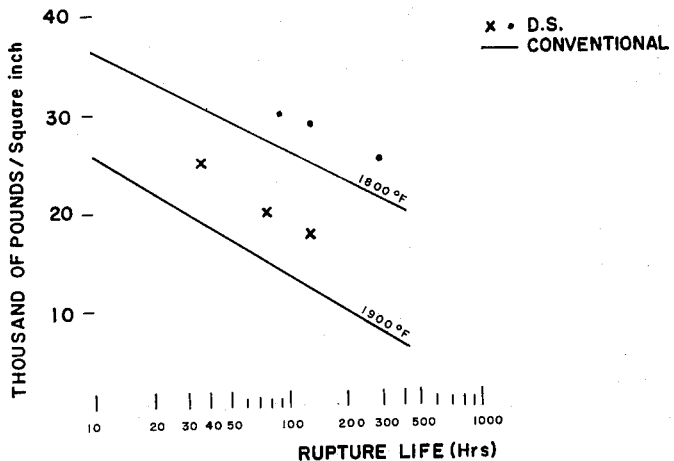
Figure 8:
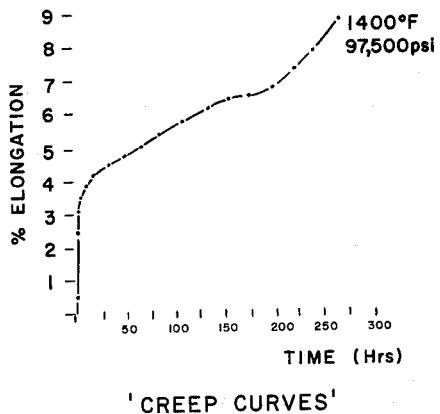
Figure 8A:
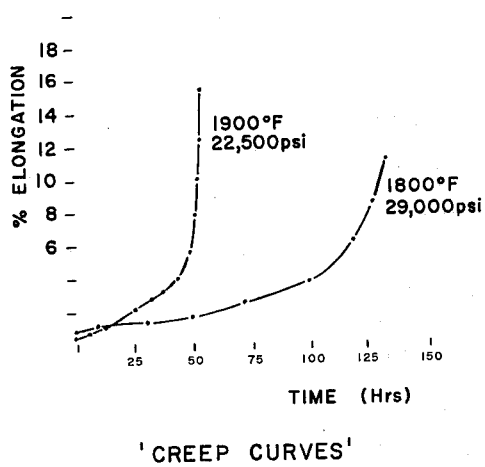
Figure 9:
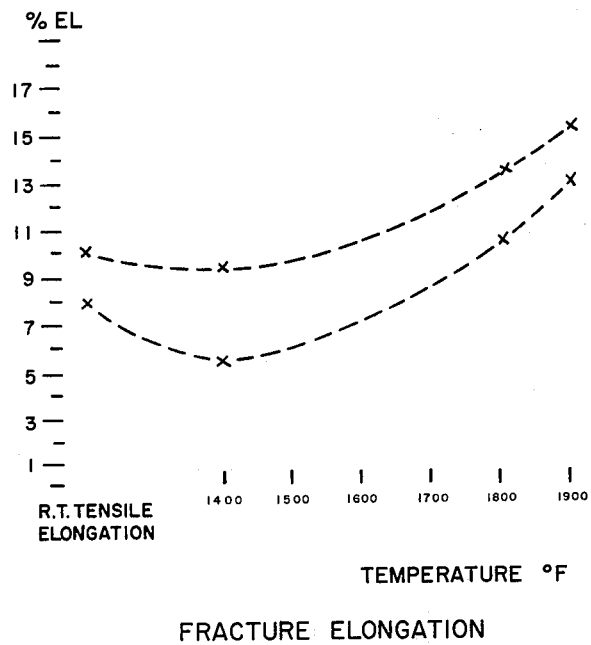
Figure 10:
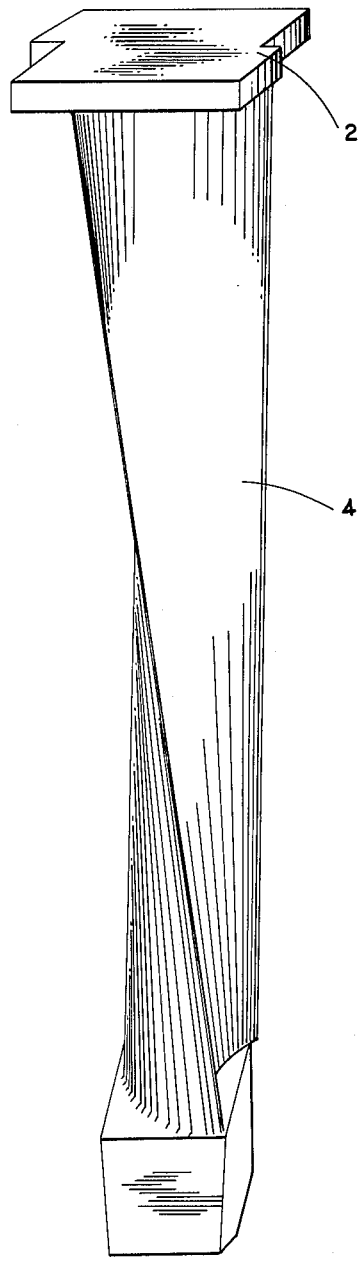
Figure 11:
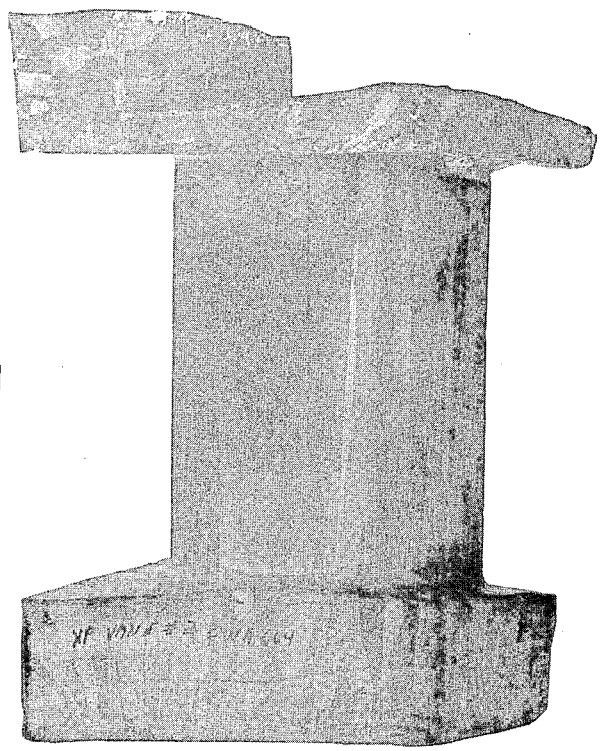
Figure 12:
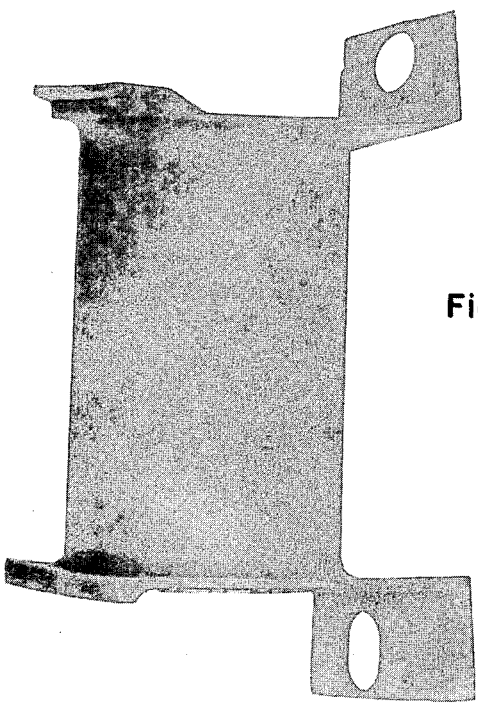
Figure 13:
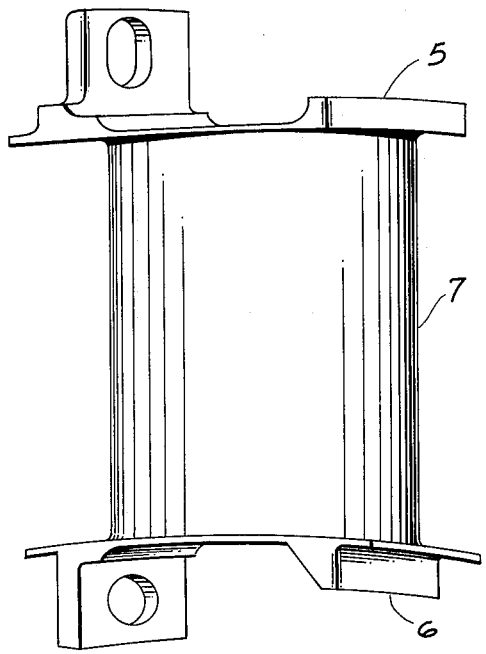

FIGURE 7 includes graphs showing stress-rupture data at 1800° F. and 1900° F. for a conventional alloy, and data at the same temperatures with respect to one of the new materials used in this invention;

FIGURE 8 is a graph showing the creep curve for a material of the present invention at 1400° F. and 97,500 p.s.i.;

FIGURE 8A are graphs showing creep curves for a material of the present invention at 1800° F. with 29,000 p.s.i. loading and 1900° F. with a loading of 22,500 p.s.i.;

FIGURE 9 is a graphical representation of fracture elongation data taken from stress rupture tests of a material of the present invention at 1800° F. and 1900° F.;

FIGURE 10 is a perspective view showing a preferred form of turbine rotor blade in accordance with the present invention;

FIGURE 11 is a photographic reproduction, in side elevation, of a cast stator vane for a gas turbine power plant, according to the present invention, and showing the vane in "as cast" condition after having been subjected to superficial etching to reveal the crystalline structure of the metal of the blade;

FIGURE 12 is a similar photographic reproduction of a conventional vane cast from a similar alloy, and also in its "as cast," superficially etched condition;

FIGURE 13 is a perspective view showing a preferred form of stator vane in accordance with the present invention.

Figure 1:
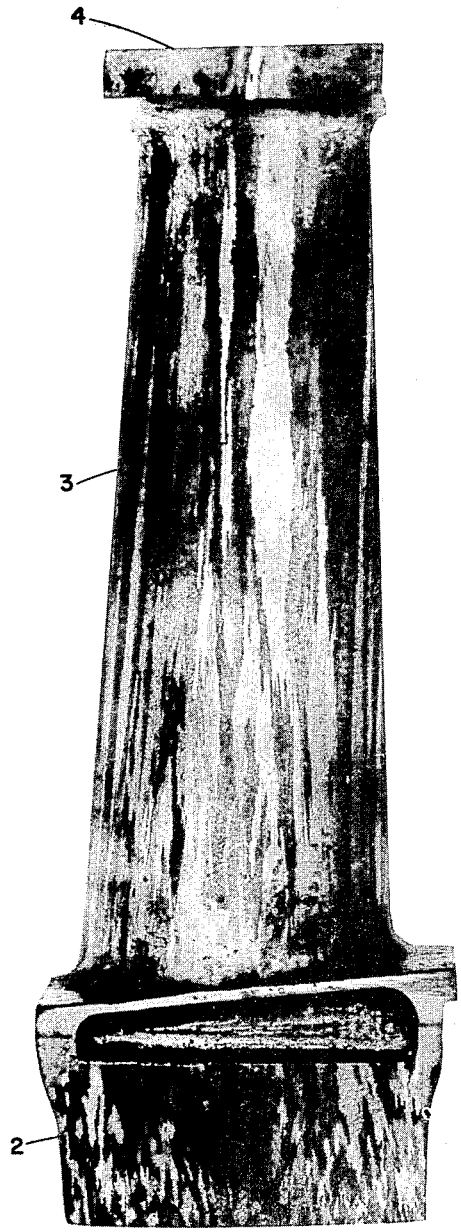
FIGURE 1 is a photographic reproduction, in side elevation, of a cast rotor blade for a gas turbine power plant, according to the present invention, and showing the blade in "as-cast" condition after having been subjected to superficial etching to reveal the crystalline structure of the metal of the blade.

As is clearly shown in FIGURES 1 and 11, the etched surface of the cast turbine rotor blade or stator vane formed from alloy "SM 200," having a face centered, cubic, crystal structure, by the shell-molding and vacuum-casting technique reveals a rotor blade or stator vane which is directionally solidified with its grain boundaries substantially parallel to the stress axis of the blade with the substantial elimination of grain boundaries normal to the principal stress axis of the rotor blade or stator vane. As shown in FIGURE 1, the crystals of the alloy are of such a size, that the elongated, columnar crystals, for the most part, extend from the root 2 of the rotor blade through the intermediate airfoil portion 3, to the shroud 4 and extending through the shroud and root. A similar effect is shown in FIGURE 11.

In the rotor blade structure shown in FIGURE 1 and similarly in the stator vane structure shown in FIGURE 11, there are substantially no grain boundaries normal to the long airfoil portion 3 of the rotor blade, and the principal stress axis of the blade is along the length of this airfoil portion. Likewise, both the root portion 2 and the shroud portion 4 of the rotor blade also have a similar columnar grain structure of elongated, columnar crystals which extend in a substantially parallel direction and extend into the intermediate airfoil portion 3 from both the root and shroud. Preferably, the elongated, columnar grains of the alloy have a length which is at least five times their maximum width.

Figure 2:
FIGURE 2 is a similar photographic reproduction of a conventional rotor blade cast from a similar alloy, and also in its "as-cast," superficially etched condition.

FIGURES 2 and 12 show similar side elevation view of a gas turbine rotor blade and a stator vane, respectively, of identical contour, made from the same alloy "SM 200" as the FIGURES 1 and 11 structures, respectively. As in FIGURES 1 and 11, the photographs show the etched surface of the rotor blade and stator vane as conventionally cast, and reveals their equi-axed polycrystalline structure with their many grain boundaries substantially normal to the stress axis of the rotor blade or stator vane.

Figure 3:
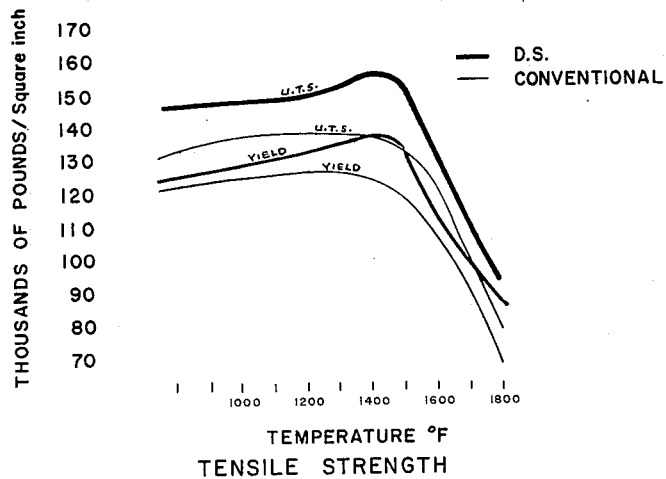
FIGURE 3 are graphs showing the values for ultimate tensile strength and yield strength of a blade material of the present invention compared with conventional blade material of the same alloy, plotted against temperature.

FIGURE 3 is a chart showing ultimate tensile strength and yield strength data from tests at various temperatures on directionally solidified cast test specimens of alloy "SM 200" having the grain boundaries parallel to the stress axis of the specimen, compared with similar cast test specimens of the same alloy with a conventional equi-axed structure. The data for the conventionally cast alloy is shown by the fine line, while the data for the directionally solidified alloy of the present invention is shown by the upper, heavy line.

Figure 4:
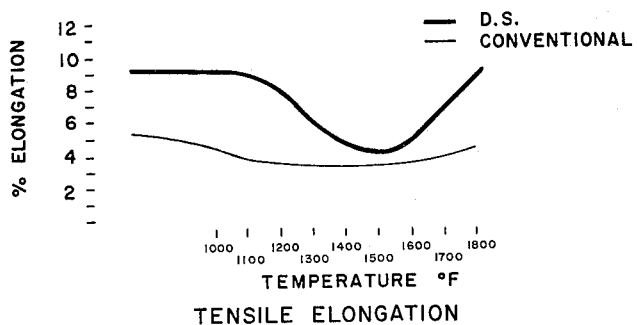
FIGURE 4 are other graphs showing the values for tensile elongation plotted against temperature, for a blade material of the present invention compared with conventional blade material of the same alloy, all plotted against temperature.
Figure 5:
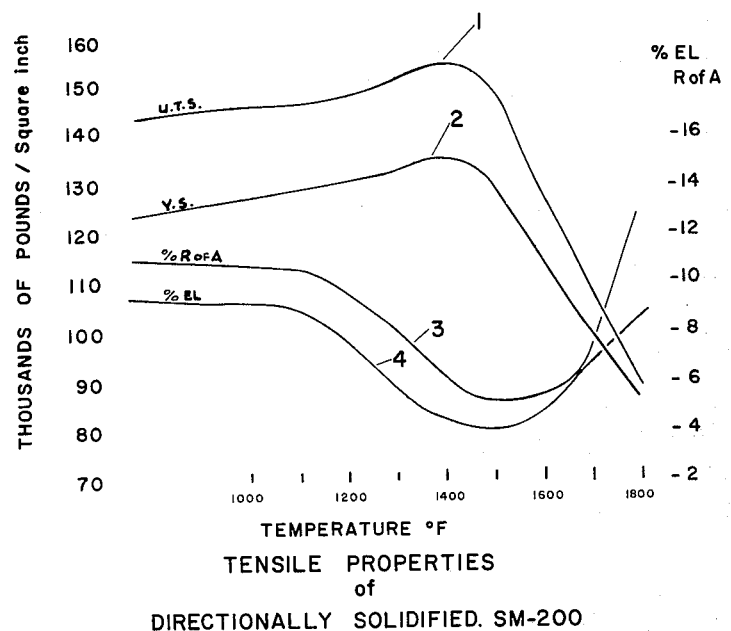
FIGURE 5 are further graphs showing values for ultimate tensile strength, yield strength, reduction of area and percentage elongation of a blade material of the present invention.

FIGURE 4 are graphs demonstrating the superiority of gas turbine blades of the present directionally solidified cast alloy "SM 200" compared with conventionally cast test specimens of alloy "SM 200" in which values for tensile elongation and percentage elongation are plotted against temperature; the heavy line indicating the values for the directionally solidified cast alloy while the fine line represents comparable values for the conventionally cast specimens;

FIGURE 5 gives complete tensile results for directionally solidified cast alloy "SM 200" in which the stress in thousands of pounds per square inch, values for percentage elongation and percentage reduction of area are plotted against temperature. Curve 1 shows the values for ultimate tensile strength in thousands of pounds. Curve 2 shows the values of yield strength at 0.2% elongation. Curve 3 shows the percentage of area reduction at various temperatures and stresses. Curve 4 shows values for percentage elongation at various temperatures.

Figure 6:
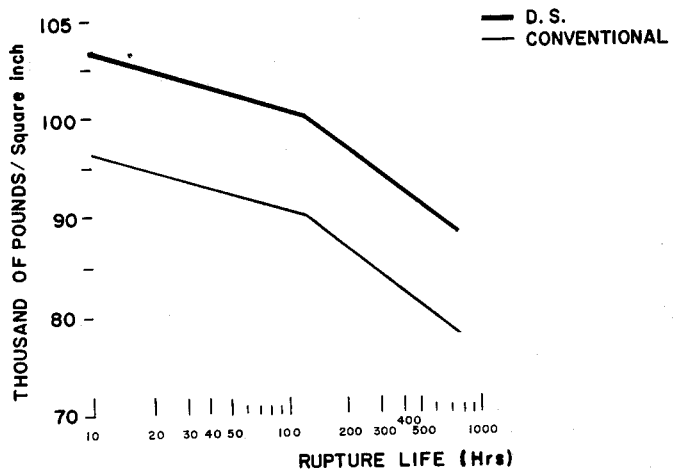
FIGURE 6 are graphs showing values for stress rupture life of directionally cast compared with conventionally cast "SM 200" at 1400° F.

FIGURE 6 shows graphs plotting stress rupture data at 1400° F. and showing stress rupture life in hours plotted against stress in thousands of pounds per square inch. The data for the directionally solidified alloy "SM 200" is shown by the upper heavy line while the lower finer line shows comparable data for the conventionally cast alloy "SM 200." It will be noted that the values for the directionally solidified material are consistently and substantially in excess of those for the conventionally cast material;

FIGURE 7 are graphs showing similar stress rupture data at 1800° F. and 1900° F., while the small dots show comparable data for the directionally solidified specimens at 1800° F. and the small crosses show comparable data for the directionally solidified material at 1900° F.;

The data of FIGURE 7 may be tabulated as follows:

| Stress, k.s.i. | Time to Rupture in Hours at 1800° F. | |
|---|---|---|
| | Conventionally Cast SM 200 | Directionally Solidified SM 200 |
| 30 | 40 | 95 |
| 29 | 46 | 134 |
| 25 | 145 | 220 |
| | Time to Rupture in Hours at 1900° F. | |
| 25 | 13 | 34 |
| 20 | 45 | 77 |
| 18 | 80 | 186 |

FIGURE 8 is a graph showing the creep curve for a directionally solidified test specimen of alloy "SM 200" corresponding to the present invention, the data being taken at 1400° F. and 97,500 p.s.i. loading;

FIGURE 8A is a composite graph showing "creep curves" for directionally solidified test specimens of alloy "SM 200" at:

1800° F. and 29,000 pounds/square inch stress;
1900° F. and 22,500 pounds/square inch stress.

As shown in FIGURES 8 and 8A, the creep values are plotted in hours against percent elongation of the test specimens. As will be noted, in each instance, creep or elongation of the test specimen exhibits the unusual property of progressing at a moderate rate over the major life of the part, after which the rate of elongation increases and continues for a considerable period of time prior to failure, thus giving rise to what may be called "third stage creep."

FIGURE 9 is a graphical representation showing fracture elongation data from stress rupture tests with the exception of the extreme left-hand data point on each curve which show tensile elongation values at room temperature. In the curves, values for percentage elongation are plotted against temperature for directionally solidified material according to the present invention.

In FIGURE 10, the gas turbine rotor blade 1 has a substantially twist between the root 2 and the blade shroud 4, as more fully described in the prior patent to Bodger No. 2,510,734 of June 6, 1950. In FIGURE 10, the elongated grains or crystals extending longi-tudinally of the blade are of the type shown in FIGURE 1, but are not shown in FIGURE 10.

While the gas turbine rotor blade may be made in various other contours, as required by the particular turbine construction, FIGURE 10 illustrates the preferred form, and a form to which the principles of the present invention may be applied for their maximum utilization.

In FIGURE 13, the stator vane has an inner shroud 5 and an outer shroud 6 and an airfoil portion 7. The entire vane is a unitary casting which has been finish machined to produce the desired shroud configuration. In FIGURE 13, the elongated grains or crystals extend parallel to the vertical axis of the airfoil portion 7 and are of the type shown in FIGURE 11.

The following comparison of rupture data for directionally solidified parts of alloy "SM 200," compared with equi-axed conventionally cast duplicate test parts, also of alloy "SM 200," shows a wide range of values obtained from the conventionally cast alloy parts, and the minimum values obtained using the directionally solidified alloy parts of the present invention.

RUPTURE LIFE IN HOURS

| | Conventional | Directionally Solidified |
|---|---|---|
| 1,400° F., 85,000 p.s.i. | 140–400 hours | 800 hours plus. |
| 1,800° F., 25,000 p.s.i. | 100–150 hours | 300 hours plus. |
| 1,900° F., 20,000 p.s.i. | 20–30 hours | 75 hours plus. |

STRESS TO PRODUCE RUPTURE IN 100 HOURS

| | | |
|---|---|---|
| 1,400° F. | 90,000 p.s.i. | 100,000 p.s.i. |
| 1,800° F. | 26,500 p.s.i. | 29,500 p.s.i. |
| 1,900° F. | 17,500 p.s.i. | 19,000 p.s.i. |

The following table shows the thermal shock resistance of stator vanes prepared from equi-axed conventionally cast alloy "SM 200" compared with stator vanes prepared from directionally solidified alloy "SM 200" when tested at temperatures of 2000° F., 2100° F. and 2200° F. for, respectively, 600 cycles, 400 cycles and 400 cycles. Each test cycle involves heating the vane in a hot gas stream to the temperature indicated, holding it at that temperature for one minute and then rapidly cooling it to room temperature.

CONVENTIONALLY CAST ALLOY SM 200 VANES

| Sample | Cycles at 2,000° F. | Cycles at 2,100° F. | Cycles at 2,200° F. | Total Cycles | Condition of Vane at end of Test |
|---|---|---|---|---|---|
| A | 300 | | | 300 | Cracked. |
| B | 600 | 400 | | 1,000 | Do. |
| C | 600 | 200 | | 800 | Do. |
| D | 300 | | | 300 | Do. |
| E | 300 | | | 300 | Do. |

DIRECTIONALLY SOLIDIFIED ALLOY SM 200 VANES

| | | | | | |
|---|---|---|---|---|---|
| 1 | 600 | 400 | 400 | 1,400 | No damage. |
| 2 | 600 | 400 | 400 | 1,400 | Do. |
| 3 | 600 | 400 | | 1,000 | Do. |
| 4 | 600 | 400 | 400 | 1,400 | Do. |

Two points become clear from the foregoing data. First, conventionally cast stator vanes have widely varying thermal shock resistance and second, the stator vanes prepared by the directional solidification process of this invention are both more uniform and better in thermal shock resistance than the conventionally cast products.

The problem of lack of uniformity in thermal shock resistance is a particularly serious one in the case of stator vanes for gas turbine engines. There is no known method for predicting the durability of any given stator vane. The following tabulation is representative, again operating at 2000° F. for 600 cycles; 2100° F. for 400 cycles; and 2200° F. for 400 cycles. The test was stopped after 1400 cycles or upon failure. In each instance, the blade was made of a standard alloy (B 1900, a competitive nickel base alloy) and conventionally cast under exactly the same conditions.

| Sample | Total Cycles | Condition at End of Test |
|---|---|---|
| F | 900 | Cracked at leading edge. |
| G | 1,050 | Do. |
| H | 1,300 | Do. |
| I | 700 | Do. |
| J | 300 | Cracked at both leading and trailing edges. |
| K | 500 | Do. |
| L | 1,400 | No damage. |
| M | 300 | Cracked at trailing edge. |
| N | 360 | Cracked at leading edge. |
| O | 100 | Do. |
| P | 200 | Do. |
| Q | 500 | Do. |
| R | 600 | Do. |
| S | 200 | Do. |

Thus, with a conventionally cast vane, one could anticipate some vanes to be reasonably resistant to thermal shock but also some to be very poor and crack after only 100 cycles. In effect therefore, it is the poorest spicemen that determines the useful life since every vane must be replaced on the theory that its life expectancy is no better than the poorest resistant product. Using the process of this invention with unidirectionally cast vanes, uniformly high thermal shock resistance is insured.

While nickel base alloys containing at least 35% nickel, preferably from 50 to 60% by weight of nickel, and especially alloy SM 200 are preferred in carrying out the present invention, generally similar results may be obtained by using the cobalt alloys with a face centered, cubic, crystal structure above referred to which include at least 35% cobalt and preferably 50% or more cobalt.

The invention in its broader aspects is not limited to the specific steps, process and compositions shown and described but departures may be made therefrom within the scope of the accompanying claims without departing from the principles of the invention and without sacrificing its chief advantages.

What is claimed is:

1. A gas contacting blade for a gas turbine power plant formed as a unitary cast structure from a strong, heat-resistant and corrosion-resistant alloy, having a face-centered cubic crystal structure and a composition of

| | Percent |
|---|---|
| Chromium | 2 to 25 |
| Aluminum | 0 to 9 |
| Titanium | 0 to 6 |
| Aluminum and titanium at least | 3.5 |
| Cobalt | 4 to 30 |
| Carbon | 0.1 to 0.5 |
| Boron | 0.005 to 0.1 |
| Zirconium | 0.05 to 0.2 |

Balance essentially nickel in a quantity of at least 35% adapted to be axially stressed at high temperatures in use, characterized by an elongated, columnar grain structure with the grain boundaries in the blade being substantially parallel to the principal stress axis and with substantially no grain boundaries normal to the stress axis.

2. A gas contacting blade as in claim 1 wherein the blade is a rotor blade having a root and a relatively long integral airfoil portion extending from the root.

3. A gas contacting blade as in claim 1 wherein the blade is a stator vane.

4. An integral gas turbine rotor blade as claimed in claim 1 in which the elongated, columnar grain structure of the airfoil portion extends into and through the root, with substantially no grain boundaries normal to the length of the airfoil portion.

5. An integral gas turbine rotor blade as claimed in claim 4 in which the blade is provided with an integral shroud at the end of the blade opposite the root and in which the elongated, columnar grain structure of the airfoil portion also extends into and throughout the shroud, with substantially no grain boundaries normal to the length of the airfoil portion.

6. An integral gas turbine rotor blade as claimed in claim 5 in which the elongated, columnar grain structure of the airfoil portion extends into and through the shroud, with substantially no grain boundaries normal to the length of the airfoil portion.

7. A gas contacting blade for a gas turbine power plant formed as a unitary cast structure from a strong, heat-resistant and corrosion-resistant alloy, having a face-centered cubic crystal structure and a composition of

| | Percent |
|---|---|
| Chromium | 15 to 27 |
| Tungsten | 5 to 12 |
| Titanium up to | 1 |
| Carbon | 0.40 to 1.20 |
| Zirconium | 0.05 to 2.5 |
| Tantalum | 3.0 to 10.0 |
| Columbium and/or tantalum to | 3.0 | the balance being essentially cobalt in a quantity of at least 35% and containing not more than 12% nickel adapted to be axially stressed at high temperatures in use, characterized by an elongated, columnar grain structure with the grain boundaries in the blade being substantially parallel to the principal stress axis and with substantially no grain boundaries normal to the stress axis.

8. A gas contacting blade as in claim 7 wherein the blade is a rotor blade having a root and a relatively long integral airfoil portion extending from the root.

9. A gas contacting blade as in claim 7 wherein the blade is a stator vane.

10. An integral gas turbine rotor blade as claimed in claim 7 in which the elongated, columnar grain structure of the airfoil portion extends into and through the root, with substantially no grain boundaries normal to the length of the airfoil portion.

11. An integral gas turbine rotor blade as claimed in claim 10 in which the blade is provide with an integral shroud at the end of the blade opposite the root and in which the elongated, columnar grain structure of the airfoil portion also extends into and throughout the shroud, with substantially no grain boundaries normal to the length of the airfoil portion.

12. An interal gas turbine rotor blade as claimed in claim 11 in which the elongated, columnar grain structure of the airfoil portion extends into and through the shroud, with substantially no grain boundaries normal to the length of the airfoil portion.

References Cited by the Examiner

UNITED STATES PATENTS

| 2,169,894 | 8/1939 | Criley. | |
| 2,891,883 | 6/1959 | Howe | 22—212 X |
| 2,951,272 | 9/1960 | Kiesler | 22—212 X |
| 3,129,069 | 4/1964 | Hanink et al. | 253—77 X |

FOREIGN PATENTS

| 449,998 | 7/1948 | Canada. |
| 489,263 | 12/1952 | Canada. |
| 372,139 | 5/1932 | Great Britain. |

MARTIN P. SCHWADRON, *Primary Examiner.*

SAMUEL LEVINE, *Examiner.*

E. A. POWELL, JR., *Assistant Examiner.*

UNITED STATES PATENT OFFICE
CERTIFICATE OF CORRECTION

Patent No. 3,260,505                                                                July 12, 1966

Francis L. Ver Snyder

It is certified that error appears in the above identified patent and that said Letters Patent are hereby corrected as shown below:

Column 11, between lines 53 and 54 insert:

Molybdenum or tungsten ................2 to 14

Signed and sealed this 31st day of March 1970.

(SEAL)
Attest:

Edward M. Fletcher, Jr.                      WILLIAM E. SCHUYLER, JR.

Attesting Officer                                 Commissioner of Patents